(12) United States Patent
Hanna et al.

(10) Patent No.: US 8,190,685 B2
(45) Date of Patent: May 29, 2012

(54) METHOD FOR MONITORING AN APPLICATION IN A PACKET-SWITCHING NETWORK

(75) Inventors: Thomas Hanna, Detmold (DE); Thorsten Laux, Lippstadt (DE)

(73) Assignee: Siemens Aktiengesellschaft, Munich (DE)

( * ) Notice: Subject to any disclaimer, the term of this patent is extended or adjusted under 35 U.S.C. 154(b) by 1368 days.

(21) Appl. No.: 10/724,799

(22) Filed: Dec. 1, 2003

(65) Prior Publication Data

US 2004/0109448 A1 Jun. 10, 2004

(30) Foreign Application Priority Data

Dec. 9, 2002 (DE) .................................. 102 57 454

(51) Int. Cl.
*G06F 15/16* (2006.01)

(52) U.S. Cl. ......................................................... 709/206

(58) Field of Classification Search .................... 709/206
See application file for complete search history.

(56) References Cited

U.S. PATENT DOCUMENTS

| | | | |
|---|---|---|---|
| 5,727,155 A * | 3/1998 | Dawson | 709/205 |
| 6,125,390 A | 9/2000 | Touboul | |
| 6,148,328 A * | 11/2000 | Cuomo et al. | 709/204 |
| 6,463,471 B1 * | 10/2002 | Dreke et al. | 709/224 |
| 7,188,143 B2 * | 3/2007 | Szeto | 709/206 |
| 7,519,667 B1 * | 4/2009 | Capps | 709/206 |
| 7,603,683 B2 * | 10/2009 | Reto | 725/34 |
| 2002/0021307 A1 * | 2/2002 | Glenn et al. | 345/753 |
| 2002/0035605 A1 * | 3/2002 | McDowell et al. | 709/206 |
| 2002/0116461 A1 * | 8/2002 | Diacakis et al. | 709/204 |
| 2002/0120687 A1 * | 8/2002 | Diacakis et al. | 709/204 |
| 2002/0184089 A1 * | 12/2002 | Tsou et al. | 705/14 |
| 2003/0009530 A1 * | 1/2003 | Philonenko et al. | 709/206 |
| 2003/0069934 A1 * | 4/2003 | Garcia-Martin et al. | 709/206 |
| 2003/0078979 A1 * | 4/2003 | Sagi | 709/206 |
| 2003/0135569 A1 * | 7/2003 | Khakoo et al. | 709/206 |
| 2003/0208543 A1 * | 11/2003 | Enete et al. | 709/206 |
| 2003/0229670 A1 * | 12/2003 | Beyda | 709/206 |
| 2004/0133640 A1 * | 7/2004 | Yeager et al. | 709/204 |
| 2004/0215731 A1 * | 10/2004 | Tzann-en Szeto | 709/207 |

FOREIGN PATENT DOCUMENTS

WO  WO 02/097651 A1  12/2002

OTHER PUBLICATIONS

IETF; 2.1.12 SIP for Instant Messaging and Presence Leveraging (simple); Jul. 31, 2001.*

* cited by examiner

*Primary Examiner* — Brian P Whipple

(57) ABSTRACT

In order to monitor an application (AP1, AP2, AP3) in a packet-switching network (NW), the state of the application (AP1, AP2, AP3) is recorded by means of a monitoring instant (MC) and is transmitted to a Presence Application (PA) which displays and/or further processes the state. For this purpose, the application (AP1, AP2, AP3) is registered by means of the monitoring instant (MC) as a first communication partner in a list of communication partners which can be accessed in the network, and the Presence Application (PA) is registered in the list as a second communication partner which monitors the first communication partner. The state and/or state changes of the application (AP1, AP2, AP3) is or are transmitted to the Presence Application (PA) as a characteristic which is associated with the first communication partner, or as a message which is transmitted from the first communication partner, with the monitoring being carried out on the basis of the characteristic or of the message.

15 Claims, 2 Drawing Sheets

METHOD FOR MONITORING AN APPLICATION IN A PACKET-SWITCHING NETWORK

CROSS REFERENCE TO RELATED APPLICATIONS

This application claims priority to the German application No. 10257454.5 DE, filed Dec. 9, 2002 and which is incorporated by reference herein in its entirety.

FIELD OF INVENTION

The invention relates to a method as claimed in the pre-characterizing clause of patent claim 1.

BACKGROUND OF INVENTION

Networks in which the network elements communicate with one another by means of packet switching are used for transmission of data and for communication purposes. Networks such as these may either be locally bounded, in which case they are referred to as LANs (LAN=Local Area Network), or else they may be distributed worldwide (WAN=Wide Area Network), for example the Internet. In addition to the connecting paths (data line), networks such as these comprise a large number of different network elements, such as switches, routers and computers (servers, workstations), the latter with applications installed in them.

For communication between the network elements, it is generally irrelevant where these network elements are physically and geographically arranged.

The data is in each case combined to form data packets for transport, and is addressed using a unique network address for the receiving network elements. Since the onward transport of the data in the network is carried out in an automated manner, the actual location of the addressed network component, for example a server with an application, is irrelevant to the user. However, this situation is different when network elements have to be accessed for the purpose of monitoring or for maintenance purposes. Control procedures are often required for this purpose, and these have to be carried out directly at the relevant network element.

In packet-switching networks, it is important to identify in good time whether an application or a network element is operating correctly, is faulty or has even stopped prematurely ("been terminated"). It should be also possible to monitor this from a central, remote location (workstation). In order to make it possible to monitor and control the network elements of widely distributed networks from a central location, these network elements frequently have interfaces for remote access. These interfaces generally operate using a standardized protocol in order that various network elements and applications can be administered from a central point owing to a single application program, which is also referred to as an administration tool. One such standardized protocol is, for example, the SNMP (Simple Network Management Protocol), which allows simultaneous monitoring and control of widely differing network elements and applications within one administration tool. The administration tool is, for example, a Presence Application, which is installed on a PC and is also referred to as an NMS (Network Management Station).

The individual applications (processes) and network elements are monitored and controlled for remote access by local monitoring instants, so-called management clients. Each management client for a network element or for an application is connected to an instant which combines the state messages from the management client and converts them to a message in accordance with the protocol. This instant is also often referred to as an SNMP agent, and the messages are frequently referred to in the literature as "SNMP traps", or "traps", for short. The SNMP agent sends the traps to one or more network management stations, where the monitored network elements and applications and their current states (for example online, offline, or the instantaneous load level) are displayed (indicated), and from where control commands can be transmitted back to the network elements and applications.

The control commands and the state information, that is to say the traps, are in this case transmitted as UDP messages (UDP=User Datagram Protocol).

In modern data networks, in particular in relatively large company networks and in the Internet, communication methods are frequently used and are known as presence/instant messaging methods. The examples of this are the applications "Windows Messenger", "AOL Messenger" or "ICQ". In this case, specific applications are installed on the workstation computers of the users, which are frequently also referred to as messaging applications and in which a list with preferred communication partners in the network is maintained. Lists such as these are also referred to as "buddy lists", because this communication method is preferably used simply for interchanging text messages with friends and acquaintances (so-called "chatting"). In the buddy list, symbols, for example in the form of a red or a green dot, mark the current status of the possible communication partner, that is to say for example whether the relevant user is currently accessible (Online), is busy, or is not registered with the network (Offline).

With regard to presence/instant messaging applications, a distinction is drawn between those with a central server, and those without a central server. While, in the case of the arrangements without a central server, the messages relating to the current state of the individual users and the messages relating to the state changes, for example offline to online, must be interchanged directly between all the relevant workstation computers, in the case of those arrangements with central servers a list of all the communication partners which can be accessed in the communication network is maintained in these servers. The state information on the individual users and the messages relating to the state changes are just transmitted from the individual workstations to these central servers, and are then noted in its list. For each communication partner in this list, note is made relating to the workstation computers on the network at which this communication partner is located in the buddy list. State messages and messages relating to state changes are then sent from this server only to those workstation computers whose user relates to this communication partner. As soon as one of the communication partners is identified in the buddy list as being online, it is possible, for example, to simply interchange text messages with that communication partner. This procedure is commonly referred to as "chatting".

Presence/instant messaging applications are known in various networks with different protocols. The Session Initiating Protocol (SIP) is predominantly used for setting up multimedia sessions in data networks, for example for speech transmission ("Voice-over-IP"=speech transmission with the aid of the Internet Protocol); in this context, the SIMPLE extension (SIMPLE=SIP for Instant Messaging and Presence Leveraging Extensions) defines a protocol extension which can be used for the purpose of presence/instant messaging.

One known method for monitoring and, in particular also for controlling computer-supported applications from a remote location is the use of so-called PC remote control programs. One example of a program such as this is the PC-Anywhere software manufactured by Symantec. In this case, special software is installed both on the PC to be monitored and to be controlled and on the PC which is used for maintenance purposes, allowing the remotely located PC to be controlled by mouse/keyboard inputs, and its screen content to be displayed on the PC's own screen. However, this is dependent on a compatible operating system being installed on both PCs and on a data channel with sufficient bandwidth being connected between the two components.

One disadvantage that has been found with the known methods for monitoring applications is that the applications and processes to be monitored must be configured in a predetermined manner. In addition, special, proprietary software (for example "HP OpenView") must often be installed in the PC hardware that is used for monitoring.

Proprietary supplements are additionally required for remotely controlled administration using the SNMP method, for example the use of programs for remote control PCs, for example "PC-Anywhere". Applications are monitored by means of the SNMP protocol in conjunction with the connection less UDP protocol, so that the loss of an event message ("Trap") is not always recorded.

SUMMARY OF INVENTION

The invention is thus based on the object of monitoring and controlling applications and network elements in a network, in a simple manner.

This object is achieved by the features specified in claim 1.

The solution provides that the application is registered by means of the monitoring instant as a first communication partner in a list of communication partners which can be accessed in the network, and that the Presence Application is registered in the list as a second communication partner which monitors the first communication partner. The state and/or state changes of the application is or are transmitted to the Presence Application as a characteristic which is associated with the first communication partner, or as a message which is transmitted from the first communication partner, with the monitoring being carried out on the basis of the characteristic or of the message. This allows the instant messaging method, which frequently exists in the networks in any case, to be used for monitoring applications and network elements. There is no need to install new network protocols and specific application programs for monitoring the applications and network elements. This allows the method also to be used in widely distributed networks, for example in the Internet.

The method is refined further in an advantageous manner by means of the characterizing features in the dependent claims.

When control instructions are transmitted from the Presence Application to the monitoring instants in order to control the application, the Presence Application can also carry out the administration, that is to say the control, of the application.

The installation of new network protocols and the use of a dedicated central network instant is avoided if a presence/ instant messaging system is used for registration and for finding monitoring instants.

State messages and messages relating to state changes are transmitted reliably if the transmission of the state is ensured by means of a handshake process.

A protocol which already exists and has been prudent in many networks is used if the registration of the application and the transmission of the state are carried out using an SIP infrastructure and the SIMPLE extension to the SIP protocol.

If an application can be monitored by means of any desired number of Presence Applications, and Presence Applications can monitor any desired number of applications, even complex networks with many applications, network elements and Presence Applications can be monitored and administered.

There is no need for manual administration procedures when restarting applications and network elements, since the monitoring instant which is associated with an application to be monitored is automatically registered in the list, or is found and registered on the basis of the request by the Presence Application.

BRIEF DESCRIPTION OF THE DRAWING

One exemplary embodiment of the method according to the invention will be explained in the following text with reference to the drawings.

DETAILED DESCRIPTION OF INVENTION

Figure 1:
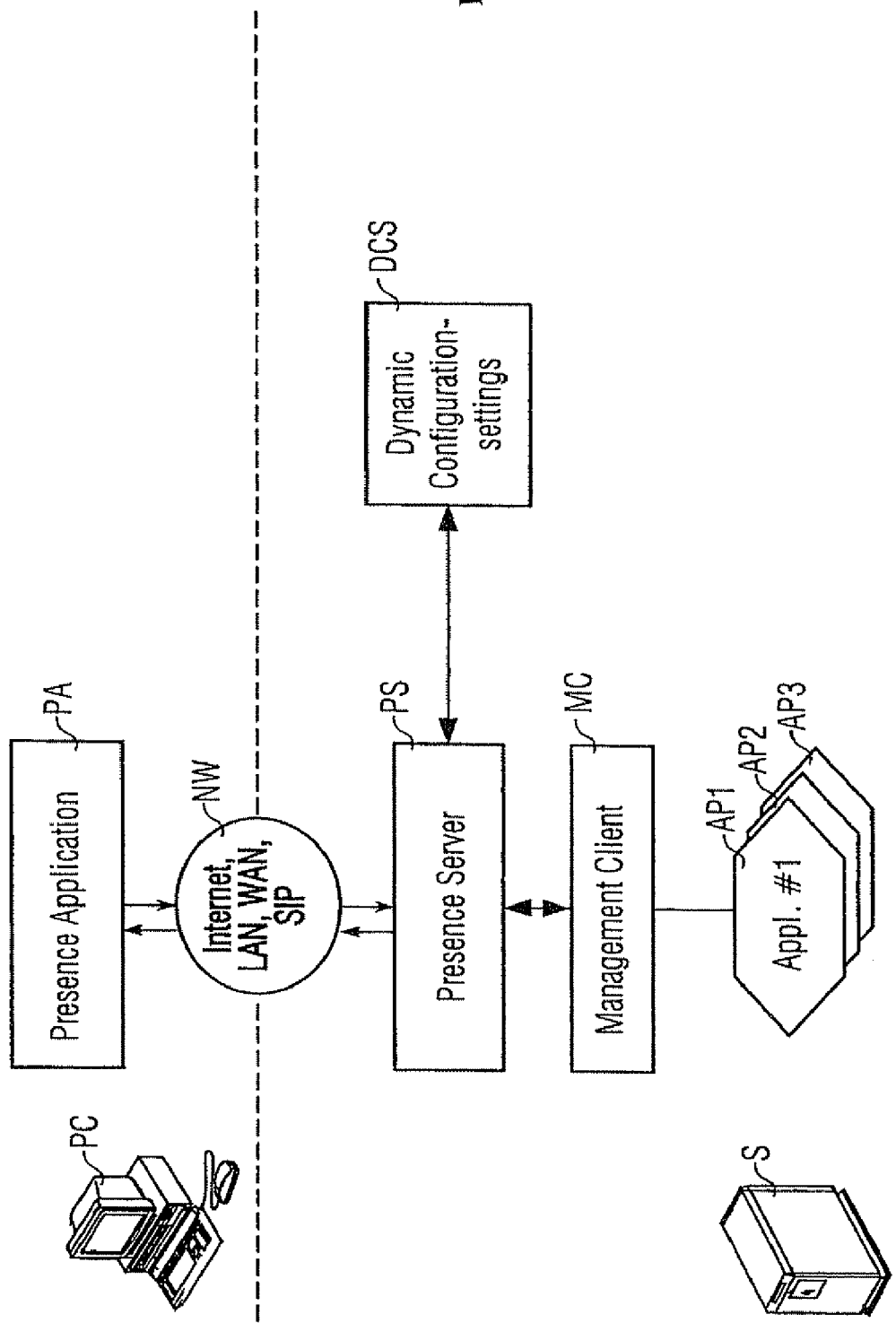
FIG. 1 shows a network NW in which a Presence Application PA, a central server PS (Presence Server) with a configuration databank DCS (Dynamic Configuration Settings) connected to it, a monitoring instant MC (Management Client) and applications AP1 (Application 1), AP2, AP3 to be monitored are provided.
Figure 2:
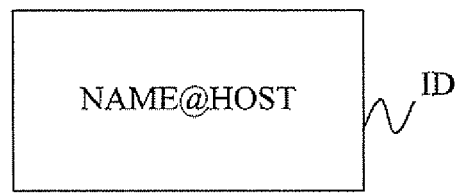
FIG. 2 shows an exemplary embodiment of an identifier that identifies an application.
Figure 3:
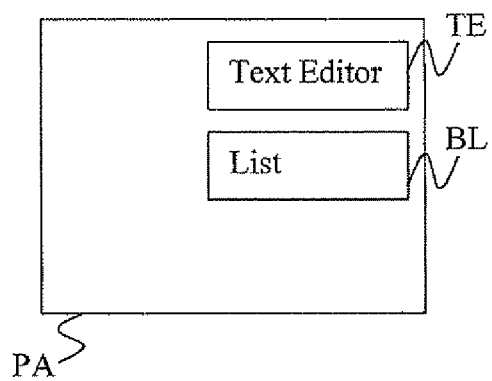
FIG. 3 show an exemplary embodiment of the Presence Application.
Figure 4:
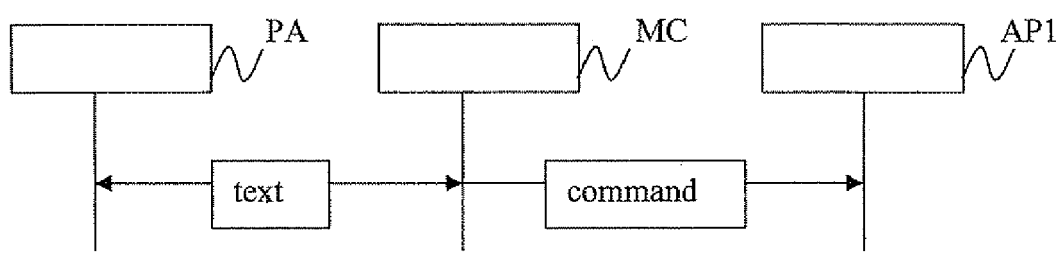
FIG. 4 shows an exemplary embodiment of transferring text messages between the Presence Application and the Management Client and transferring a command from the Management Client to the application.

Messenger software is installed as a Presence Application PA on a workstation computer PC and is used for administration, display and use of a list of subscribers in a network NW. A user can enter other users in the network NW in this list (Buddy-List), with these other users being its potential communication partners, whose respective status in the network NW should be displayed permanently. This status draws a distinction between "Online", "Offline" and "Busy", whilst providing the user with a quick overview of the potential communication partners with which he can set up a communication link at the present time.

In addition to the states that have been mentioned, any other desired states, either predefined or self-defined, can also be displayed.

(Text) messages can be produced with the aid of a (text) editor, for sending to the communication partners. The text messages which have been sent from the communication partners to the workstation computer PC of this user are displayed in a display window (which is not illustrated).

The Presence Application PA has access to a Presence Server PS via the network NW. The Presence Server PS is a central instant in the network NW where the state information for the communication partners is recorded and is passed on to all of those Presence Applications PA where the corresponding communication partner is included in the buddy list. A databank DCS which is associated with the Presence Server PS is used to store which Presence Application PA must be supplied with the state information for which communication partners. The Presence Server PS is also used for passing on the (text) messages. Two or more Presence Servers PS may, of course, also be arranged in a network NW, in addition to any desired number of users (Communication Partners, Presence Applications, Applications).

The Presence Server PS communicates with one or more management clients MC. In this case, each management client MC may be installed on the same hardware (Host) as the Presence Server, and may also be integrated in the Presence Server PS. The management client MC is used for monitoring the applications AP1, AP2, AP3. Each application AP1, AP2, AP3 is installed on the same server S as the Presence Server PS and the management client MC; however, it may also be installed on a different network element in the network NW, or else may be a "standalone" appliance which, for example, is arranged as a router in the network NW.

The network NW is a local area data network (LAN) which interchanges data by means of packet switching in accordance with the Internet Protocol (IP protocol). The network NW is also used for speech data communication (Voice-Over-IP) which is handled on the basis of the SIP protocol (Session Initiation Protocol). The SIP protocol is operated in the network NW by means of the SIMPLE extension, which provides protocol elements for simple, secure communication in instant messaging environments.

The monitoring of the application program Winword.Exe as the application AP1 will be described in the following text as one example of a monitoring process. The status of this application AP1 should be displayed continuously on the workstation computer PC within the Presence Application PA. In order to monitor the application AP1 "Winword.Exe", the user of the workstation computer PC starts the Presence Application PA and enters the application "Winword.Exe" there as the communication partner to be searched for. In this case, he enters as a supplementary address element the Internet address (IP address) of the server S on which the application "Winword.Exe" is installed. This procedure reflects the addressing in an SIP environment. Users are in this case identified on the basis of the pattern Name@Host ID (for example winword.exe@129.103.148.155). The host name may, of course, also be used instead of the IP address and is then resolved by a name server (DNS Server) that is arranged in the network NW. The Presence Application PA is now registered via the network NW as the user of the Presence Server PS. For this purpose, in addition to the name and the network address of the application "Winword.Exe" to be monitored, monitoring data is also interchanged between the Presence Application PA and the Presence Server PS and is used for the authentication that is required for the registration process. The Presence Server PS now enters in its configuration databank DCS the name and the network address of the Presence Application PA as well as the information relating to the fact that the Presence Application PA should be supplied with the state messages and the messages relating to state changes of the application "Winword.Exe".

The Presence Server PS then starts a checking process, which is repeated at regular time intervals, with the management client MC that is associated with it to determine whether any state information can be recorded by an application AP1 "Winword.Exe" which is associated with that management client MC and, if necessary, stores in the management client MC the instruction to signal the information relating to the current state and future state changes of the application AP1 "Winword.Exe" to the Presence Server PS. The management client MC is in this case used as a "process monitor", by means of which it is also possible to monitor and control those processes (applications) which have no specific monitoring interface (for example SNMP interface).

Each state information item which arrives at the Presence Server PS is transmitted via the application AP1 and in accordance with the information that is stored in the configuration databank DCS via the network NW to the Presence Application PA, where it is visualized.

The user list BL (Buddy List) which is maintained in the Presence Application PA represents a process list for the applications AP1, AP2, AP3, in which the "Online-Status" (Online, Offline, busy) corresponds to the process status (active, closed, busy) for the application AP1, AP2, AP3. The instant messaging function (chat function) for the "natural" users of the Presence Application PA is related to the applications AP1, AP2, AP3 to form a trace function. Text-based information which is sent from the management client MC to the Presence Application PA, where it is visualized, is used for detailed description of the status of the respective applications AP1, AP2, AP3, and may also be stored for further processing, or passed on to other applications (instances).

Text-based information which is sent in the opposite direction is evaluated by the management client MC, and is converted to control commands for the respective application AP1, AP2, AP3.

The Presence Application PA need not—as described here—be an application that is created for communication between "natural" users. Alternatively, the Presence Application PA may also be specific software for monitoring and controlling applications AP1, AP2, AP3, which controls the protocol elements that can be used in the network NW, that is to say in this case the SIP protocol with the SIMPLE extension, in order to access the management client or management clients MC associated with the applications AP1, AP2, AP3.

The invention claimed is:

1. A method for remotely monitoring a software application in a packet-switching network comprising:
   registering the software application by a monitoring application as a first communication partner in a list of communication partners accessible in the network, the software application residing on a first computing machine on a server side of the network;
   registering a presence application in the list as a second communication partner which monitors the first communication partner, the presence application residing on a second computing machine, the second computing machine an end user device;
   transmitting information identifying the software application to be monitored to the first computing machine, the information including a name of the software application;
   remotely monitoring the software application by the registered presence application; and
   transmitting a state of the software application to the presence application as a message transmitted from the first communication partner,
   wherein the monitoring is carried out on the basis of the message, and
   wherein the state of the software application is displayed by the second computing machine as part of a buddy list.

2. The method as claimed in claim 1, wherein an instant messaging system is used for the registration.

3. The method as claimed in claim 1, wherein the transmission of the state is secured by a handshake process.

4. The method as claimed in claim 1, wherein the registration of the software application and the transmission of the state are carried out using an SIP infrastructure and the SIMPLE extension to the SIP protocol.

5. The method as claimed in claim 1, wherein the software application is monitorable by a plurality of presence applications, and a plurality of software applications are monitorable by the presence application.

6. The method as claimed in claim 1, wherein the monitoring application which is associated with the software application to be monitored is automatically registered in the list.

7. The method as claimed in claim 1, wherein the monitoring the software application comprises:
 entering, by an end user of the second communication partner, the information identifying the software application prior to the transmitting.

8. The method as claimed in claim 7, wherein the information is entered via a text editor of the presence application.

9. The method as claimed in claim 1,
 wherein the second computing machine receives the software application identifying information, and
 wherein the software application is located in response to receiving the information.

10. The method as claimed in claim 9, wherein the registration of the software application is in response to locating the software application.

11. The method as claimed in claim 1, wherein the software application identifying information includes an IP address of a computing machine in which the software application is installed.

12. The method as claimed in claim 1, wherein the software application identifying information includes a host name of a computing machine in which the software application is installed.

13. A method for remotely monitoring a software application in a packet-switching network comprising:
 registering the software application by a monitoring application as a first communication partner in a list of communication partners accessible in the network, the software application residing on a first computing machine of a server side of the network;
 registering a presence application in the list as a second communication partner which monitors the first communication partner, the presence application residing on a second computing machine of an end user;
 transmitting information identifying the software application to be monitored to the first computing machine, the information including a name of the software application;
 remotely monitoring the software application by the registered presence application:
 transmitting a state of the software application to the presence application as a message transmitted from the first communication partner; and
 transmitting a control instruction from the presence application to the monitoring application, the control instruction for controlling the software application,
 wherein the monitoring is carried out on the basis of the message, and
 wherein the state of the software application is displayed by the second computing machine as part of a buddy list.

14. The method as claimed in claim 13,
 wherein the control instruction is transmitted to the monitoring application as an instant message.

15. The method as claimed in claim 14, wherein the monitoring application receives the instant message and converts the instant message to a control command for the software application.

\* \* \* \* \*